US012801316B2

(12) United States Patent
Ito

(10) Patent No.: US 12,801,316 B2
(45) Date of Patent: Nov. 17, 2026

(54) INFORMATION PROCESSING APPARATUS CAPABLE OF DETERMINING RISK OF INFORMATION LEAKAGE IN PRINT JOB, CONTROL METHOD, AND STORAGE MEDIUM

(71) Applicant: CANON KABUSHIKI KAISHA, Tokyo (JP)

(72) Inventor: Akiko Ito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 316 days.

(21) Appl. No.: 18/598,968

(22) Filed: Mar. 7, 2024

(65) Prior Publication Data

US 2024/0303013 A1 Sep. 12, 2024

(30) Foreign Application Priority Data

Mar. 10, 2023 (JP) ................................ 2023-037691

(51) Int. Cl.
*G06F 21/71* (2013.01)
*G06F 3/12* (2006.01)

(52) U.S. Cl.
CPC .......... *G06F 3/1222* (2013.01); *G06F 3/1204* (2013.01); *G06F 3/1238* (2013.01)

(58) Field of Classification Search
USPC ................. 358/1.1–3.29, 530; 382/154–159, 382/168–229; 700/90–102; 726/1–35
See application file for complete search history.

(56) References Cited

U.S. PATENT DOCUMENTS 10,649,703 B2 * 5/2020 Tadachi .............. G06F 21/6245
2008/0198421 A1 * 8/2008 Hirahara ............ H04N 1/00244 358/403

(Continued)

FOREIGN PATENT DOCUMENTS

JP 2008044154 A 2/2008
JP 2015050563 A 3/2015

OTHER PUBLICATIONS

Jian, Qi-chen; Risk Assessment Method Of Printing System, Device And Storage Medium; 2020 (Year: 2020).*

(Continued)

*Primary Examiner* — Marcellus J Augustin
(74) *Attorney, Agent, or Firm* — Canon U.S.A., Inc. IP Division

(57) ABSTRACT

An image processing apparatus that determines a risk of confidential information leakage in a print job, the information processing apparatus includes at least one memory that stores instructions, and at least one processor that executes the instructions to detect confidential information from print data acquired from the print job, acquire a risk level of each job attribute of the print job, execute a weighting process for the risk level of each job attribute, using the detected confidential information and information of weight for the job attribute set for each confidential information, determine the risk of confidential information leakage for the print job, using the weighting-processed risk level of each job attribute, and restrict printing of the print job according to a result of the determination of the risk of confidential information leakage.

10 Claims, 13 Drawing Sheets

(56) References Cited

U.S. PATENT DOCUMENTS

| | | | | |
|---|---|---|---|---|
| 2009/0122347 | A1* | 5/2009 | Utsubo | G06F 3/1239 358/1.16 |
| 2013/0321850 | A1* | 12/2013 | Tsuji | G06K 15/4095 358/1.14 |

OTHER PUBLICATIONS

Osada Koichi; Information Processing System, Confidential Information Leakage Prevention Method, and Confidential Information Leakage Prevention Program; 2016 (Year: 2016).*

Funatsu Shinji; Confidential Document Monitoring Device, Confidential Document Monitoring Program, and Confidential Document Monitoring System; 2020 (Year: 2020).*

* cited by examiner

INFORMATION PROCESSING APPARATUS CAPABLE OF DETERMINING RISK OF INFORMATION LEAKAGE IN PRINT JOB, CONTROL METHOD, AND STORAGE MEDIUM

BACKGROUND

Field

The present disclosure relates to an information processing apparatus for determining a risk of information leakage in a print job, a control method of the information processing apparatus, and a storage medium.

Description of the Related Art

With an increase in social interest in information security, there is a demand for a technique for automatically detecting whether or not confidential information exists in a large number of documents with high accuracy. Further, there is a concern about information leakage by paper due to diversification of ways of working, and there are needs to limit printing of confidential information. Here, the confidential information is information for which secrecy needs to be held, such as confidential information of the own company, confidential information of another company, or personal information.

Japanese Patent Application Laid-Open No. 2008-044154 discloses a print restriction technique in which confidential information is detected from the contents of a print job and approval is requested to an authorized administrator.

Japanese Patent Application Laid-Open No. 2015-50563 discloses a technique of storing a confidential information detection result and a user who has made a processing request in a server.

However, in the technique disclosed in Japanese Patent Application Laid-Open No. 2008-044154, when the confidential information is detected, the administrator needs to give the approval to all the detected results, so that an approval work load of the administrator is large. Further, a user who has issued a processing request needs to wait for printing until the administrator gives the approval.

Further, in the technique disclosed in Japanese Patent Application Laid-Open No. 2015-50563, although the confidential information detection result and the user who has made the processing request can be identified, since the process cannot be stopped before printing, information leakage cannot be prevented in advance.

As described above, when the conventional technique is used to prevent the information leakage due to printed matters, the administrator needs to give the approval to all the documents whose confidential information has been detected. However, there is a case where the administrator wants to permit printing because even the document whose confidential information has been detected may have a low risk of information leakage depending on a person who performs the printing or a place. Accordingly, when the administrator gives the approval to all the documents whose confidential information has been detected, the approval workload is too large for the administrator.

SUMMARY

According to an aspect of the present disclosure, an information processing apparatus that determines a risk of confidential information leakage in a print job, the information processing apparatus includes at least one memory that stores instructions, and at least one processor that executes the instructions to detect confidential information from print data acquired from a print job, acquire a risk level of each job attribute of the print job, execute a weighting process for the risk level of each job attribute, using the detected confidential information and information of weight for the job attribute set for each confidential information, determine a risk of confidential information leakage for the print job, using the weighting-processed risk level of each job attribute, and restrict printing of the print job according to a result of the determination of the risk of confidential information leakage.

Further features of the present disclosure will become apparent from the following description of exemplary embodiments with reference to the attached drawings.

DESCRIPTION OF THE EMBODIMENTS

Hereinafter, embodiments of the present disclosure will be explained with reference to the accompanying drawings. The following embodiments do not limit the disclosure of the claims, and all combinations of the features explained in the embodiments are not necessarily essential as solutions of the disclosure.

First Embodiment

Figure 1:
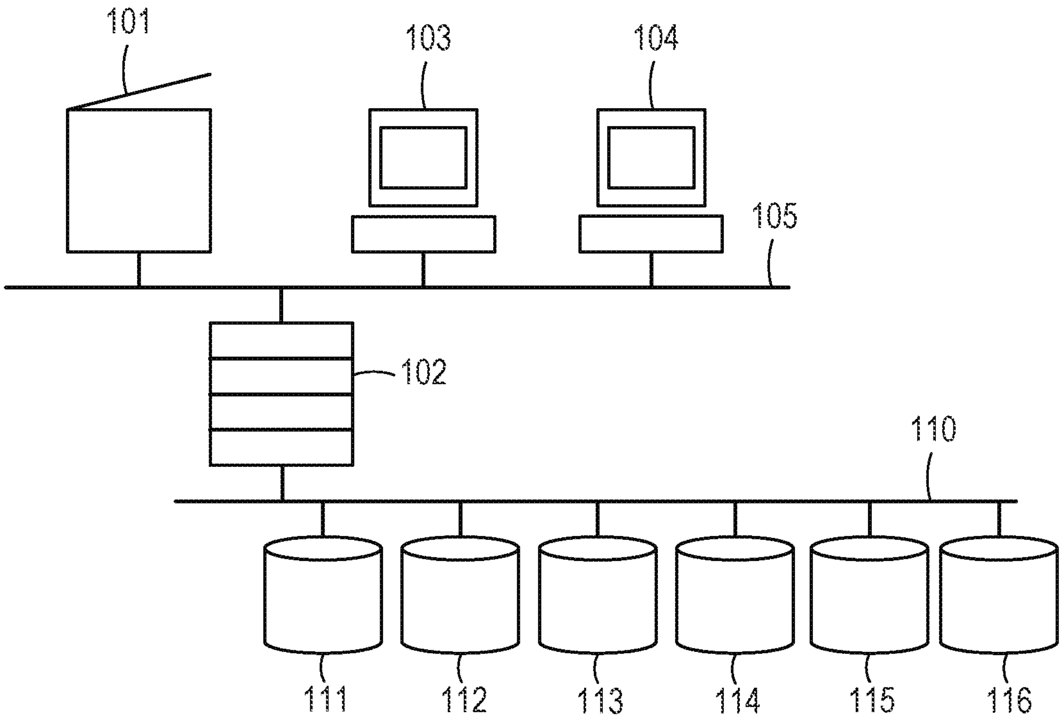
FIG. 1 is a diagram illustrating an example of a configuration of an image processing system according to an embodiment.

FIG. 1 is a diagram illustrating an example of a configuration of an image processing system according to the first embodiment of the present disclosure.

The image processing system includes an image forming apparatus 101, an image processing server 102, an information processing terminal 103, and an administrator terminal 104.

Further, the image processing system includes a confidential information keyword database 111, a personal information rule database 112, an organization setting database 113, a keyword risk database 114, a log management database 115, and an organization's personal information database 116.

The image forming apparatus 101, the image processing server 102, the information processing terminal 103, and the administrator terminal 104 are mutually connected via a network 105 and thus communicable with others.

The image processing server 102, the confidential information keyword database 111, the personal information rule database 112, the organization setting database 113, the keyword risk database 114, the log management database 115, and the organization's personal information database 116 are mutually connected via a network 110 and thus communicable with others.

The image processing server 102 may include any or all of the functions of the confidential information keyword database 111, the personal information rule database 112, the organization setting database 113, the keyword risk database 114, the log management database 115, and the organization's personal information database 116.

The image forming apparatus 101 has a function of executing a print job received from the image processing server 102. The image forming apparatus 101 may be a printing apparatus or a multifunction peripheral including a printing function.

The image processing server 102 is an information processing apparatus that acquires the print job from the information processing terminal 103 based on a process instruction of a user, and transmits the print job to the image forming apparatus 101.

The image processing server 102 inspects the print job before transmitting it to the image forming apparatus 101, and records a result of the inspection in the log management database 115.

As a result of the inspection, when the image processing server 102 decides that there is a risk of information leakage in the print job, the image processing server 102 notifies the administrator terminal 104 and stops the transmission of the print job to the image forming apparatus 101. The notification may include a request of approval of the print job to an administrator, and printing may be executed after the approval of the print job. The details will be described later.

For example, a general-purpose computer such as a server computer, a personal computer (PC) or the like is applied to the image processing server 102 and the administrator terminal 104.

As an example of the network 105, the Internet, a LAN (Local Area Network) or the like is applied.

Figure 2:
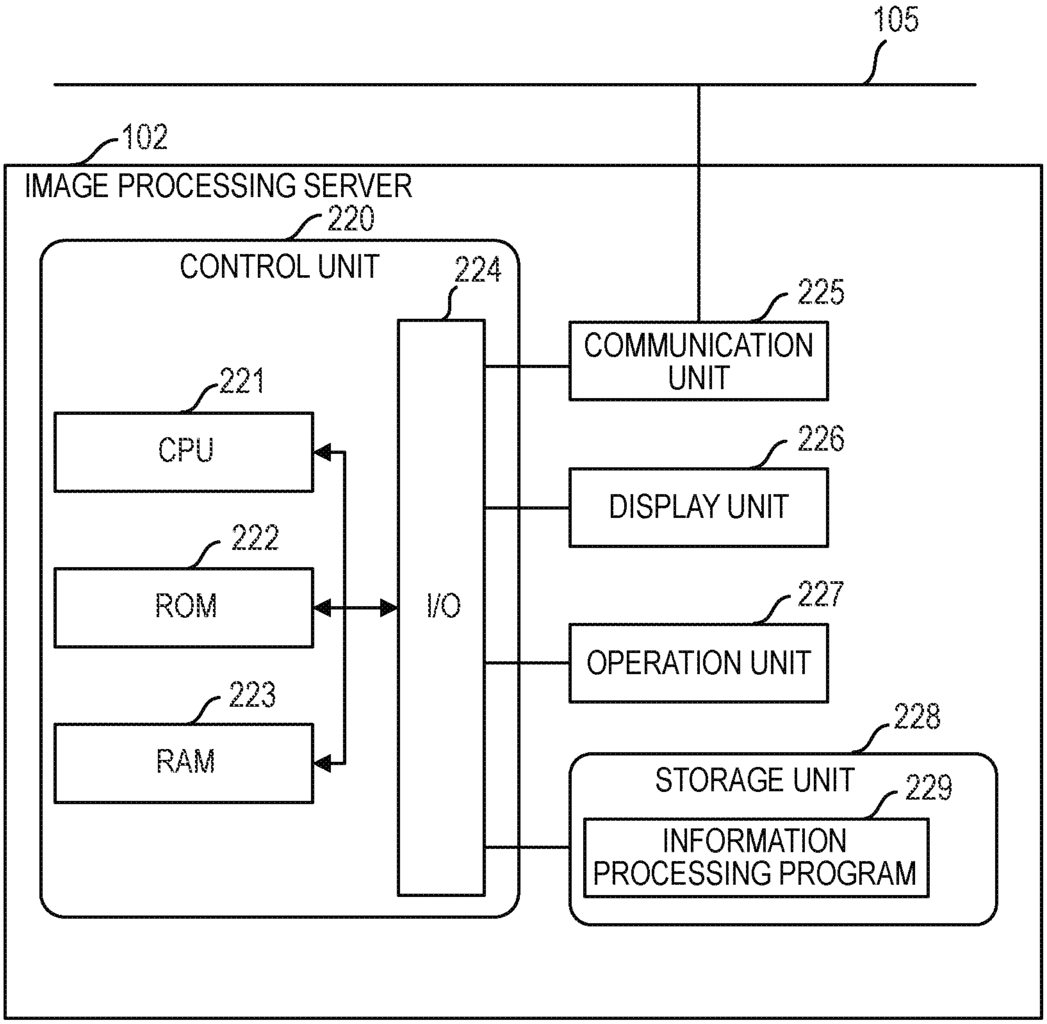
FIG. 2 is a diagram illustrating an example of a hardware configuration of an image processing server according to the embodiment.

FIG. 2 is a diagram illustrating an example of a hardware configuration of the image processing server 102 according to the present embodiment.

As illustrated in FIG. 2, the image processing server 102 includes a control unit 220, a communication unit 225, a display unit 226, an operation unit 227, and a storage unit 228.

The control unit 220 includes a CPU 221, a ROM 222, a RAM 223, and an input/output interface (I/O) 224, and these units are connected to others via a bus.

The communication unit 225, the display unit 226, the operation unit 227, and the storage unit 228 are connected to the I/O 224. These units can communicate with the CPU 221 via the I/O 224.

The communication unit 225 is an interface that connects the image processing server 102 to the network 105.

As the display unit 226, for example, a liquid crystal display (LCD), an organic EL (Electro Luminescence) display or the like is used. The display unit 226 may integrally include a touch panel.

As the operation unit 227, for example, an operation input device such as a keyboard, a mouse or the like is used.

The display unit 226 and the operation unit 227 receive various instructions on the image processing server 102 from the user. The display unit 226 displays various kinds of information such as a result of a process executed according to the instruction received from the user, a notification for the process, and the like.

The display unit 226 and the operation unit 227 may be integrated such as a touch panel or the like.

The administrator may confirm or operate the above information using the display unit 226 and the operation unit 227, or may confirm or operate the information from a web browser or the like running on the administrator terminal 104 via the communication unit 225.

The information processing terminal 103 and the administrator terminal 104 can be realized also in the same configuration as illustrated in FIG. 2.

As the storage unit 228, for example, an HDD (Hard Disk Drive), an SSD (Solid State Drive), a flash memory or the like is used. The storage unit 228 stores an information processing program 229.

The CPU 221 realizes various functions of the image processing server 102 by loading programs stored in the ROM 222 and the storage unit 228 into the RAM 223 as necessary and executing the loaded programs.

Figure 3:
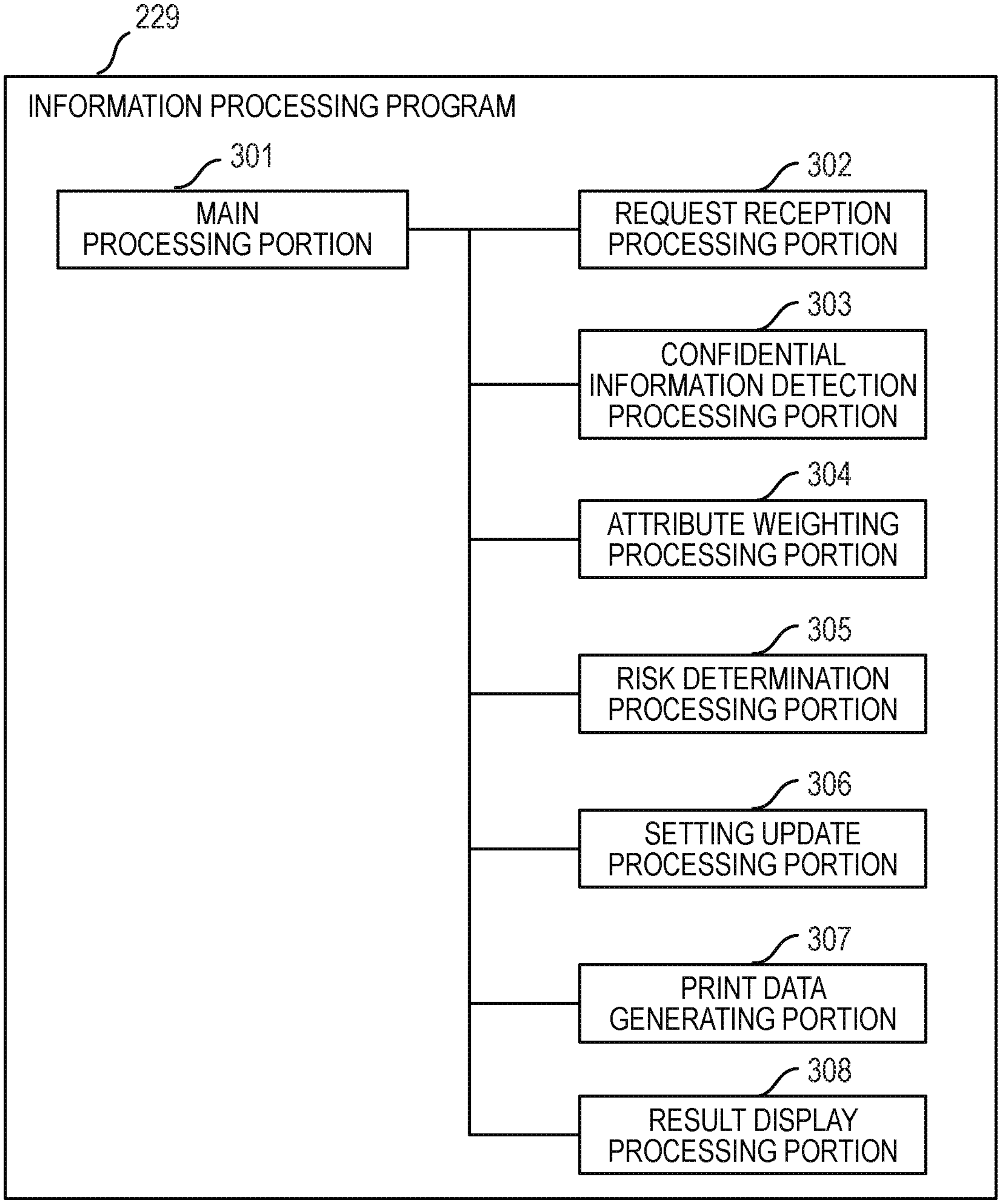
FIG. 3 is a diagram illustrating an example of a software configuration of the image processing server according to the embodiment.

FIG. 3 is a diagram illustrating an example of a software configuration of the image processing server 102 according to the present embodiment.

The information processing program 229 corresponds to a program for causing the image processing server 102 to function as a main processing portion 301, a request reception processing portion 302, a confidential information detection processing portion 303, an attribute weighting processing portion 304, a risk determination processing portion 305, a setting update processing portion 306, a print data generating portion 307, and a result display processing portion 308.

These functions are realized when the CPU 221 loads and executes the information processing program 229 into the RAM 223.

The main processing portion 301 has a general function of entire processes relating to the function of the information processing program 229.

The request reception processing portion 302 receives the acquisition of the print job by the image processing server 102, and requests the main processing portion 301 to execute the process. The request reception processing portion 302 stores the print job in the storage unit 228 of the image processing server 102.

Here, with respect to the print job, the decision of the risk of information leakage executed by the image processing server 102 will be explained with reference to a specific example.

The print job includes job image data (print image data) as print data and job information, and is held in the storage unit 228.

The job image data is binary data for being printed by the image forming apparatus 101. The job information is generated by the information processing terminal 103, and includes a user ID of the user who operates the information processing terminal 103, an IP address of the information processing terminal 103, a time at which the image processing server 102 receives the print job, and the like.

The print job may include PDL (Page Description Language) data as the print data. In this case, the print data generating portion 307 executes a rendering process on the PDL data as the print data included in the print job to generate image data.

For example, when a print instruction is input to document data edited by an application, the information processing terminal 103 converts the document data into the print data such as the PDL data which can be interpreted by the image forming apparatus 101 with a printer driver. The converted print data is transmitted to the image processing server 102.

For example, an employee having a user ID "AAA0123" being outside a company operates the information processing terminal 103, and prints a document described as "operation profit" at 10:15. Thus, the print job is transmitted from the information processing terminal 103 to the image processing server 102.

Table 1 shows information (job information 1) of the print job received by the image processing server 102.

TABLE 1

| Job information 1 | |
|---|---|
| User ID | AAA0123 |
| Reception time | 2022/9/14 10:15 |
| IP address | 192.10.4.5 |

The confidential information detection processing portion 303 has a function of executing a confidential information detection process as illustrated in later-described FIG. 5.

The attribute weighting processing portion 304 has a function of executing an attribute weighting process as illustrated in later-described FIG. 6.

The risk determination processing portion 305 has a function of executing a risk determination process as illustrated in later-described FIG. 7.

The setting update processing portion 306 has a function of executing a setting update process as illustrated in later-described FIG. 12.

The print data generating portion 307 has a function of generating the image data from the print job.

The result display processing portion 308 has a function of executing result display processes as illustrated in later-described FIGS. 10 and 11.

<Main Process Flow>

Figure 4:
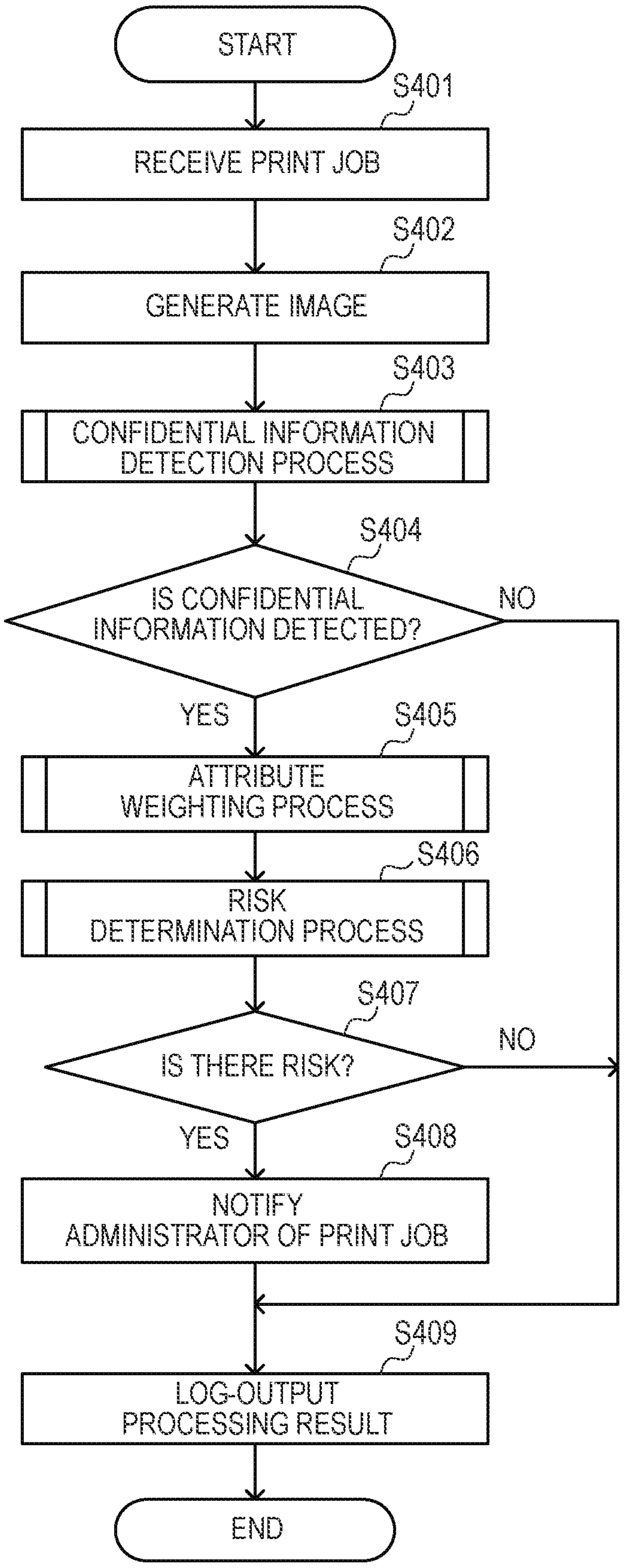
FIG. 4 is a flowchart illustrating an example of a process of inspecting a print job according to the embodiment.

FIG. 4 is a flowchart illustrating an example of a process of inspecting the print job, according to the present embodiment. This process is executed by the main processing portion 301 of the image processing server 102.

That is, this process is executed by the function realized by the CPU 221 loading and executing the information processing program 229 into the RAM 223.

In S401, when the main processing portion 301 receives the print job from the request reception processing portion 302, the main processing portion 301 stores the print job in the storage unit 228.

In S402, the main processing portion 301 requests the print data generating portion 307 to generate an image from the print job. The print data generating portion 307 generates the image from the print data of the print job, and stores the generated image in the storage unit 228.

In S403, the main processing portion 301 requests the confidential information detection processing portion 303 to execute the confidential information detection process. The details will be described later with reference to FIG. 5.

In S404, the main processing portion 301 decides whether or not the confidential information is detected in S403. The decision as to whether or not the confidential information is detected may be made when more than the number of the confidential information held in the storage unit 228 is detected, or may be made based on a risk level of a detection keyword.

Here, when the confidential information is not detected (NO in S404), the main processing portion 301 advances the process to S409, and log outputs a process result. The details of S409 will be described later.

On the other hand, when the confidential information is detected (YES in S404), the main processing portion 301 advances the process to S405.

In S405, the main processing portion 301 requests the attribute weighting processing portion 304 to execute the attribute weighting process for weighting each job attribute using a numerical value which is a risk level.

The purpose of this is to filter the print job to be notified to the administrator by executing the weighting based on the job attribute instead of notifying the administrator of all the confidential information detection results of S403.

For example, the job attributes of the job information 1 exemplified in Table 1 are "user ID", "reception time", and "IP address". The risk levels of the job attributes are determined by the organization setting database 113 and the keyword risk database 114.

Weighting result information, which is a result of the attribute weighting process, includes the job information and the risk level for the job attribute. The details will be explained with reference to FIG. 6.

In S406, the main processing portion 301 requests the risk determination processing portion 305 to execute the risk determination process of the print job. A unique risk value for the print job is calculated from the risk levels of the plurality of job attributes added in S405, and it is determined whether or not there is the risk for the print job. The details will be explained with reference to FIG. 7.

Next, in S407, the main processing portion 301 decides whether or not the risk is determined in S406. Here, when it is determined that there is not the risk (NO in S407), the main processing portion 301 advances the process to S409 and log outputs the process result.

On the other hand, when it is determined that there is the risk (YES in S407), the main processing portion 301 advances the process to S408.

In S408, the main processing portion 301 refers to the organization's personal information database 116 to notify the administrator of the print jobs filtered based on the presence/absence of the risk in S407 among the print jobs subjected to the confidential information detection process in S403.

Further, the main processing portion 301 stops the print job received by the image processing server 102. The print job may be restarted when the administrator is approved as a result of the notification to the administrator.

Here, the organization's personal information database 116 will be explained.

Table 2 shows an example of the organization's personal information database 116.

As shown in Table 2, the organization's personal information database 116 stores user classifications, user IDs, and contact addresses. An "administrator" is the user classification described in the organization's personal information database 116.

The administrator can change the settings of the confidential information keyword database 111, the personal information rule database 112, the organization setting database 113, the keyword risk database 114 and the organization's personal information database 116. Further, the administrator can refer to the log management database 115.

TABLE 2

| Organization's personal information database 116 | | |
|---|---|---|
| User classification | User ID | Contact address |
| administrator | AAA0089 | aaa0089@mail.com |
| ordinary | AAA0123 | aaa0123@mail.com |
| ordinary | AAA0124 | aaa0124@mail.com |

After the notification process to the administrator (S408), the main processing portion 301 advances the process to S409.

In S409, the main processing portion 301 acquires the process result from the storage unit 228, records it in the log management database 115, and ends the process of this flowchart.

The log management database 115 stores the images generated in S402, the detection keywords being the confidential information detection results in S403, the weighting result information being the process results of the attribute weighting processing portion 304, the risk values of the print jobs being the process results of the risk determination processing portion 305, and information representing print job restriction availability information.

Table 3 shows an example of the log management database 115.

TABLE 3

| Log management database 115 | | | | |
|---|---|---|---|---|
| Image | Confidential information detection result | Weighting result information | Risk value | Print availability |
| (binary data) | operation profit (1) | user ID: AAA0123 (3), reception time: 2022/9/14 10:15 (1), IP address: 192.10.4.5(2) | 6 | restricted |
| (binary data) | —<br>(none) | user ID: AAA0124 (1), reception time: 2022/9/14 10:31 (1), IP address: 192.1.2.3(1) | 1 | available |

Figure 5:
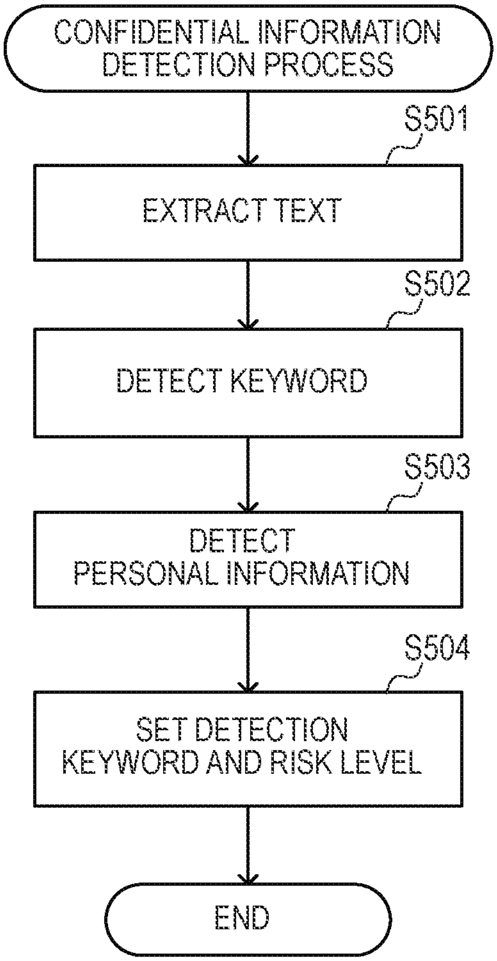
FIG. 5 is a flowchart for explaining a confidential information detection process according to the embodiment.

FIG. 5 is a flowchart for explaining the confidential information detection process (S403) according to the present embodiment. The process of this flowchart is executed by the confidential information detection processing portion 303 of the image processing server 102.

In S501, the confidential information detection processing portion 303 extracts a text from the image data generated in S402 of FIG. 4, and stores the extracted text in the storage unit 228. The text is extracted, for example, by executing a known region analysis process or a known OCR (Optical Character Recognition) process.

Next, in S502, the confidential information detection processing portion 303 detects a keyword included in the text extraction result (the text extracted in S501) based on the confidential information keyword database 111.

Further, the confidential information detection processing portion 303 stores the detected keyword (detection keyword) and the risk level of the detection keyword in the storage unit 228.

Note that the confidential information keyword database 111 stores common secret keywords such as "company secret" and "carry-out prohibition", and unique keywords registered by the administrator such as a document title and a project name.

The risk level of the detection keyword is determined from the number of detection keywords.

For example, when only "operation profit" is the detection keyword among the keywords registered in the confidential information keyword database 111, the risk level of the detection keyword is determined to be "1", which is the number of the detection keywords.

The confidential information keyword database 111 may refer to detection keywords as in the keyword risk database 114 exemplarily shown in Table 5 to be described later.

Next, in S503, the confidential information detection processing portion 303 stores the detection keyword and the risk level of the detection keyword included in the text extraction result in the storage unit 228, based on the personal information rule database 112.

The organization's personal information database 116 stores a character string pattern (a normalization pattern of an address, a telephone number and the like) matching a specific rule and the risk level of the detection keyword.

Similar to the confidential information keyword database 111, the organization's personal information database 116 may define specific personal information as a keyword.

The risk level of the detection keyword is determined by the number of keywords detected. A detection keyword risk may be preset in the organization's personal information database 116.

Next, in S504, the confidential information detection processing portion 303 stores the detection keyword and the risk level of the detection keyword acquired in S502 and S503 in the storage unit 228 as the confidential information detection results.

In the above example, the detection keyword is set as an attribute, the detection keyword "operation profit" is set as the risk level "1" of the detection keyword, and they are held in the storage unit 228.

Figure 6:
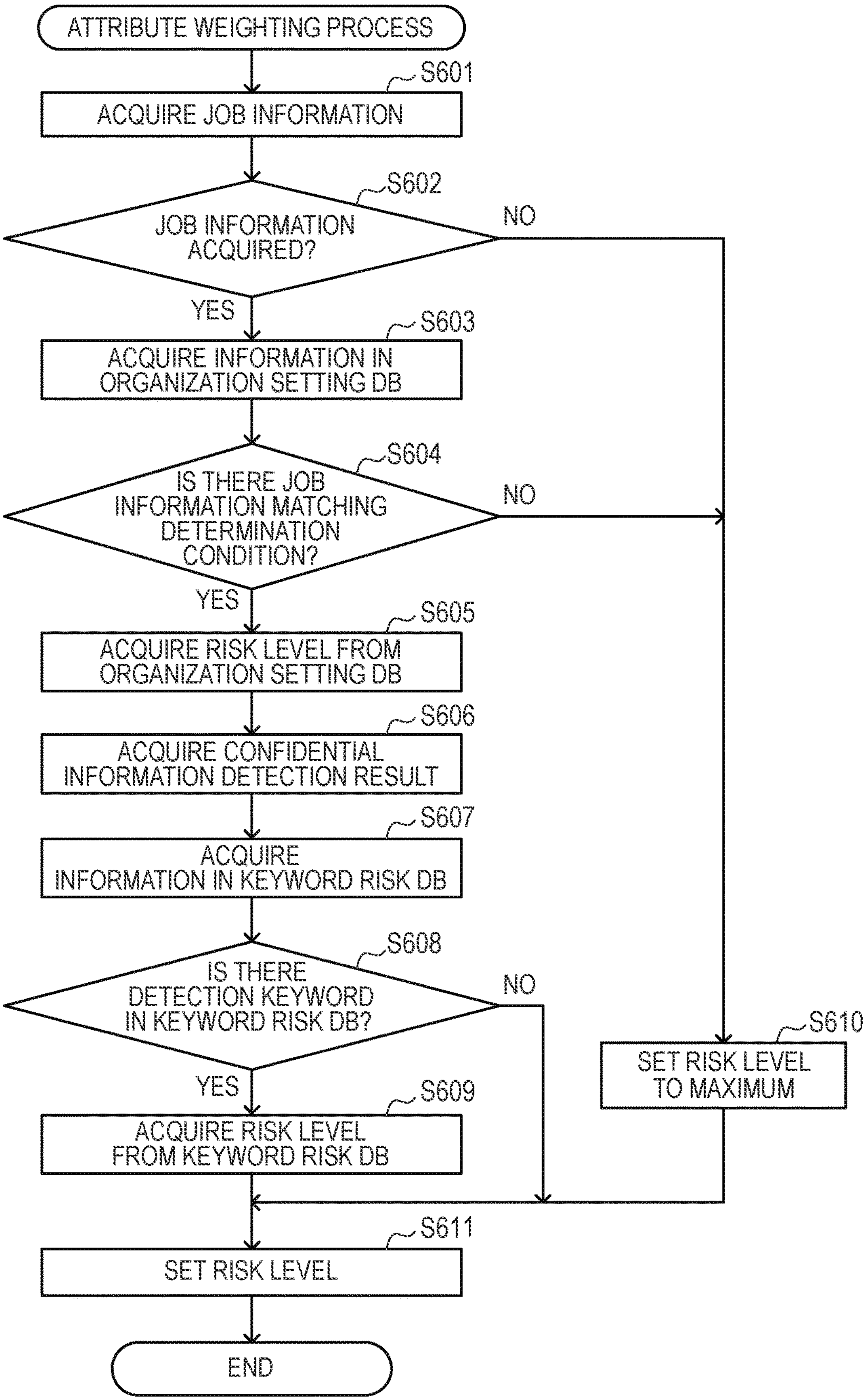
FIG. 6 is a flowchart for explaining an attribute weighting process according to the embodiment.

FIG. 6 is a flowchart for explaining the attribute weighting process (S405) according to the present embodiment. The process of this flowchart is executed by the attribute weighting processing portion 304 of the image processing server 102.

In S601, the attribute weighting processing portion 304 acquires the job information held in the storage unit 228.

In S602, the attribute weighting processing portion 304 decides whether the job information could be acquired from the storage unit 228 in S601.

Here, when the job information could not be acquired (NO in S602), the attribute weighting processing portion 304 advances the process to S610 to set the risk level to the maximum value. The details of S610 will be described later.

On the other hand, when the job information could be acquired (YES in S602), the attribute weighting processing portion 304 advances the process to S603.

In S603, the attribute weighting processing portion 304 acquires the information held in the organization setting database 113 in order to acquire organization-specific setting information.

The organization setting database 113 stores the job information, risk level determination conditions of the job information, and the risk levels, for example. An example of the organization setting database 113 is shown in Table 4.

TABLE 4

| Organization setting database 113 | | |
|---|---|---|
| Job information | Risk level determination condition | Risk level of organization setting |
| user ID | regular employee numbers (AAA0001 to AAA9999) | 1 |
| | dispatched employee numbers (BBB0001 to BBB9999) | 1.5 |
| working time | 8:30-17:00 | 1 |
| | 7:00-8:30/17:00-22:00 | 1.1 |
| | 22:00-7:00 next day | 2 |
| IP address | private network | 1 |
| | public network | 2 |

Next, in S604, the attribute weighting processing portion 304 decides, for each item of the job information, whether or not there is the job information acquired in S601 matching the risk level determination condition of the organization setting database 113.

For example, in the case of "job information 1" exemplarily shown in Table 1, the user ID "AAA0123" matches the risk level determination condition "regular employee numbers (AAA0001 to AAA9999)" of the organization setting database 113.

The reception time "2022/9/14 10:15" matches the risk level determination condition "working time (8:30-17:00)" of the organization setting database 113.

Further, it is assumed that the IP address "192.10.4.5" matches the risk level determination condition "public network" of the organization setting database 113.

That is, in the case of "job information 1", it is decided that there is the job information matching the risk level determination condition.

In S604, when there is no job information matching the risk level determination condition (NO in S604), the attribute weighting processing portion 304 advances the process to S610 to set the risk level to the maximum value.

On the other hand, when there is the job information matching the risk level determination condition exists (YES in S604), the attribute weighting processing portion 304 advances the process to S605.

In S605, the attribute weighting processing portion 304 acquires the risk level of the organization setting corresponding to the risk level determination condition decided in S604 for each item (for each job attribute), and stores the acquired risk level in the storage unit 228.

For example, since the user ID "AAA0123" of "job information 1" corresponds to the risk level determination condition "regular employee numbers (AAA0001 to AAA9999)" of the organization setting database 113, the risk level of the organization setting of the user ID is "1".

Similarly, the risk level of the organization setting of the reception time of the job information 1 is "1", and the risk level of the organization setting of the IP address is "2".

Next, in S606, the attribute weighting processing portion 304 acquires the confidential information detection result in S403 of FIG. 4 from the storage unit 228.

Next, in S607, the attribute weighting processing portion 304 acquires the information held in the keyword risk database 114 described with the risk level of the detection keyword with respect to the detection keyword acquired in S606.

Table 5 shows an example of the keyword risk database 114.

The keyword risk database 114 stores the detection keywords, the job attributes corresponding to the detection keywords, and the risk levels (weights) of the detection keywords corresponding to the job attributes. Further, a condition of the job attribute can be set as the job attribute corresponding to the detection keyword.

For example, the job attribute for the detection keyword "operation profit" is "user ID", and the condition of the job attribute is "other than accounting department".

TABLE 5

| Keyword risk database 114 | | |
|---|---|---|
| Detection keyword | Corresponding job attribute | Risk level of detection keyword corresponding to job attribute |
| operation profit | user ID (other than accounting department) | 3 |
| company secret | IP address | 2 |

In S608, the attribute weighting processing portion 304 decides whether or not the detection keyword acquired in S606 is included in the keyword risk database 114 acquired in S607.

Here, when the detection keyword is not included in the keyword risk database 114 (NO in S608), the attribute weighting processing portion 304 advances the process to S611. The process in S611 will be described later.

On the other hand, when the detection keyword is included in the keyword risk database 114 (YES in S608), the attribute weighting processing portion 304 advances the process to S609.

In S609, the attribute weighting processing portion 304 acquires the job attribute and the risk level corresponding to the detection keyword in the keyword risk database 114, and stores them in the storage unit 228.

Since the detection keyword in the present embodiment is "operation profit", the risk level "3" of the detection keyword corresponding to the job attribute of the "user ID" corresponding to "operation profit" is acquired from the keyword risk database 114 and held in the storage unit 228. Here, it is assumed that the user ID "AAA0123" of the job information 1 is a user ID other than the economical part.

After the process of S609, the attribute weighting processing portion 304 advances the process to S611.

When NO in S602 or NO in S604, in S610, the attribute weighting processing portion 304 sets the risk level of the job attribute to the maximum as "exceptional risk level", and stores it in the storage unit 228. For example, when the setting range of the risk level is "1 to 99", "99" is set.

After the process of S610, the attribute weighting processing portion 304 advances the process to S611.

In S611, the attribute weighting processing portion 304 executes the weighting by the risk level for each job attribute (for example, the user ID, the reception time, the IP address) held in the storage unit 228, and stores the result thereof together with the confidential information detection result (FIG. 5) in the storage unit 228 as the weighting result information.

Hereinafter, the details thereof will be explained.

When the risk level of the organization setting (S605) exists, the risk level of the job attribute is obtained from the risk level of the organization setting (S605) and the risk level of the detection keyword corresponding to the job attribute (S609). When there is no risk level of the organization setting, the risk level is obtained from the exceptional risk level (S610).

Hereinafter, an example of "job information 1" described above will be specifically explained.

First, the risk levels of the organization settings (S605) are as follows: the risk level of the organization setting of the user ID="1"; the risk level of the organization setting of the reception time="1"; and the risk level of the organization setting of the IP address="2".

The risk level of the detection keyword corresponding to the job attribute (S609) is as follows: the risk level (weight) of "user ID" corresponding to the detection keyword "operation profit"="3".

In the present embodiment, the risk level of the job attribute is obtained by multiplying the risk level of the organization setting by the risk level of the detection keyword corresponding to the job attribute.

That is, the risk level of the job attribute of "user ID" is as follows: a value "(1×3)=3" obtained by multiplying the risk level "1" of the organization setting by the risk level (weight) "3" of the detection keyword corresponding to the job attribute. The method of calculating the risk level of the job attribute is not limited to this.

As described above, the risk levels of the job attributes corresponding to "job information 1" are as follows: the risk level of the job attribute of the user ID="3"; the risk level of the job attribute of the reception time="1"; and the risk level of the job attribute of the IP address="2".

On the other hand, when there is no risk level of the organization setting and there is no risk level of the job attribute corresponding to the detection keyword, that is, when NO in S602 or NO in S604, the risk level of the job attribute is as follows: the exceptional risk level="99".

The weighting result information includes the detection keyword and the risk level of the detection keyword (the number of detection keywords explained with reference to FIG. 5), and the job information and the risk level corresponding to the job attribute.

An example of the attribute weighting process result "weighting result information 1" of this flowchart for "job information 1" is shown in Table 6.

TABLE 6

| Weighting result information 1 | | |
|---|---|---|
| Detection keyword | Operation profit | 1 |
| user ID | AAA0123 | 3 (1 × 3) |
| reception time | 2022/9/14 10:15 | 1 |
| IP address | 192.10.4.5 | 1 |

Figure 7:
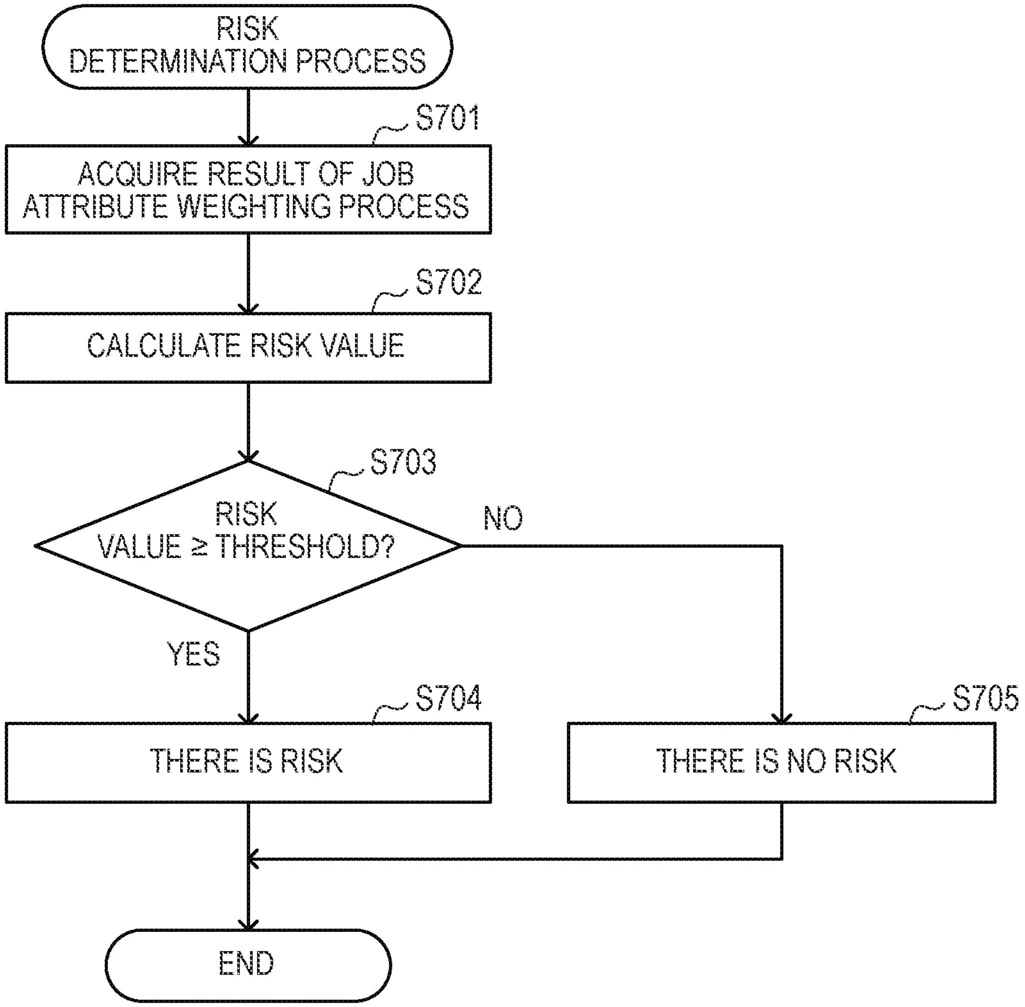
FIG. 7 is a flowchart for explaining a risk determination process according to the embodiment.

FIG. 7 is a flowchart for explaining the risk determination process (S406) according to the present embodiment. The process of this flowchart is executed by the risk determination processing portion 305 of the image processing server 102.

In S701, the risk determination processing portion 305 acquires the attribute weighting process result (in the above example, "weighting result information 1") of S405 (i.e., FIG. 6) of FIG. 4 from the storage unit 228.

In S702, the risk determination processing portion 305 calculates a unique risk value for the weighting result information from the weighting result information acquired in S701. The risk value is a value obtained by multiplying each risk level.

(risk value for weighting result information 1)=(risk level of detection keyword)×(risk level of user ID)×(risk level of reception time)×(risk level of IP address)

In the above example, the risk value for "weighting result information 1" is "6" because 1 (risk level of detection keyword)×3 (risk level of user ID)×1 (risk level of reception time)×2 (risk level of IP address).

The method of calculating the risk value is not limited to this. For example, the risk value may be calculated by addition, or another calculation method may be used depending on the risk level.

Next, in S703, the risk determination processing portion 305 decides whether the risk value is equal to or larger than a predetermined threshold (e.g., "5").

The threshold is set by the information processing program 229 of the image processing server 102, but may be changed by the administrator or may be set by referring to another database.

Here, when the risk value is equal to or larger than the threshold (YES in S703), the risk determination processing portion 305 advances the process to S704.

In S704, the risk determination processing portion 305 stores, as the weighting result information acquired in S701, the risk value and information indicating "there is a risk" in the storage unit 228, and ends the process of this flowchart.

On the other hand, when the risk value is smaller than the threshold (NO in S703), the risk determination processing portion 305 advances the process to S705.

In S705, the risk determination processing portion 305 stores, as the weighting result information acquired in S701, the risk value and information indicating "there is no risk" in the storage unit 228, and ends the process of this flowchart.

In S409 of FIG. 4, the above result is recorded in the log management database 115, for example, as shown in the first line of the log management database 115 exemplified in Table 3.

According to the above process procedure, the weighting of the risk level by the job attribute is executed (S405) for the result of the confidential information detection (S403), the unique risk value for the print job is calculated, and the print job whose confidential information has been detected can be filtered (S406).

Thus, it is possible to reduce a workload for the confirmation by the administrator.

For example, the print job of "there is no risk" may be allowed to be printed without the approval by the administrator, and only the print job of "there is a risk" may be limited to be printed and the print job thereof may be allowed to be printed after the approval by the administrator.

This makes it possible to reduce the risk of information leakage due to printed matters while significantly reducing the load on the administrator's approval work.

Second Embodiment

In the second embodiment, a configuration in which the administrator can easily change the setting by referring to the process result (S409 of FIG. 4) will be explained. Note that, in the explanation of the present embodiment, explanations of the portions of the same configuration and process procedures as those in the first embodiment will be omitted, and only portions different from the first embodiment will be explained.

Figure 8A:
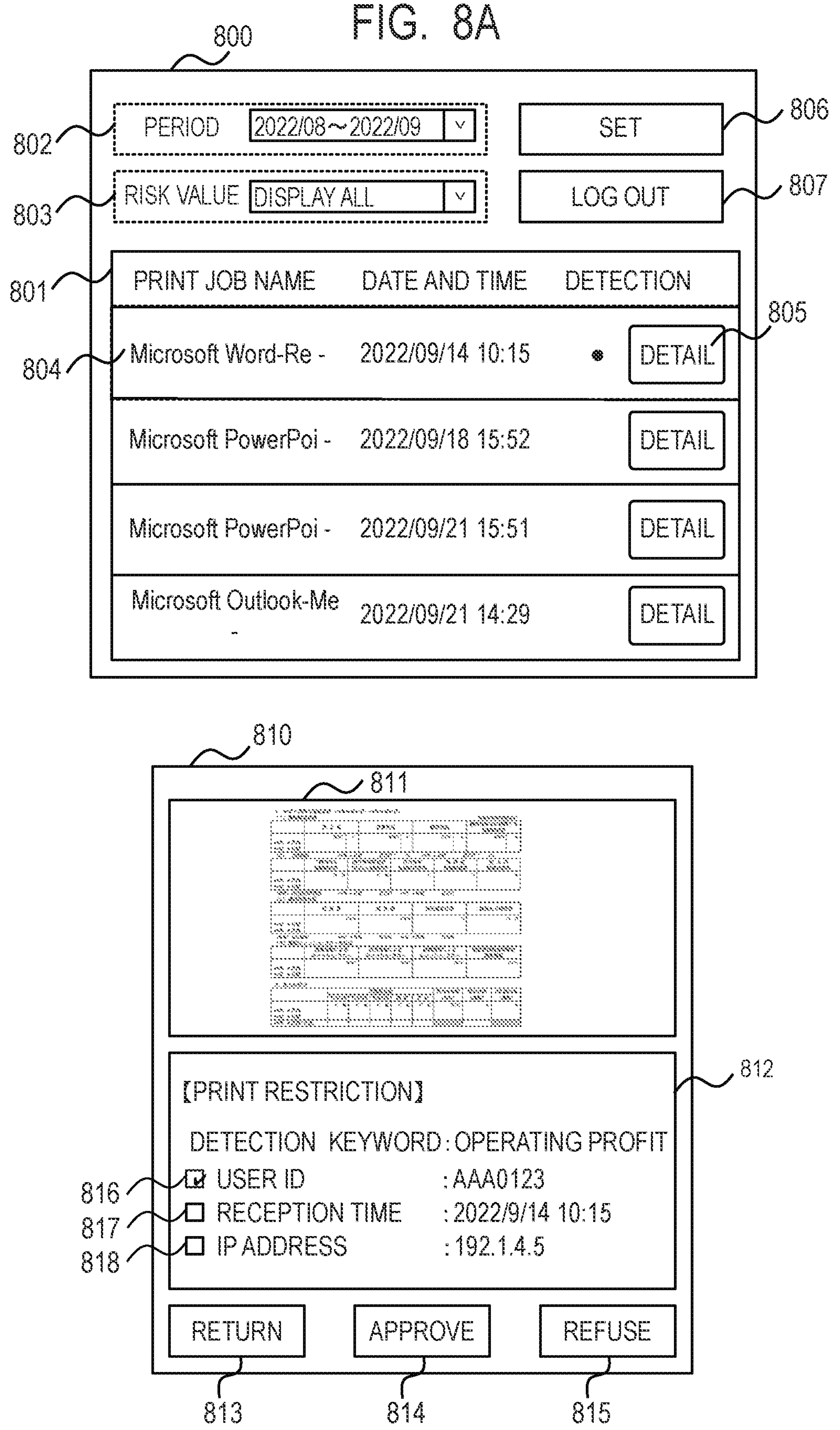
FIG. 8A is a diagram for explaining a configuration for an administrator to confirm an inspection result of a print job.
Figure 8B:
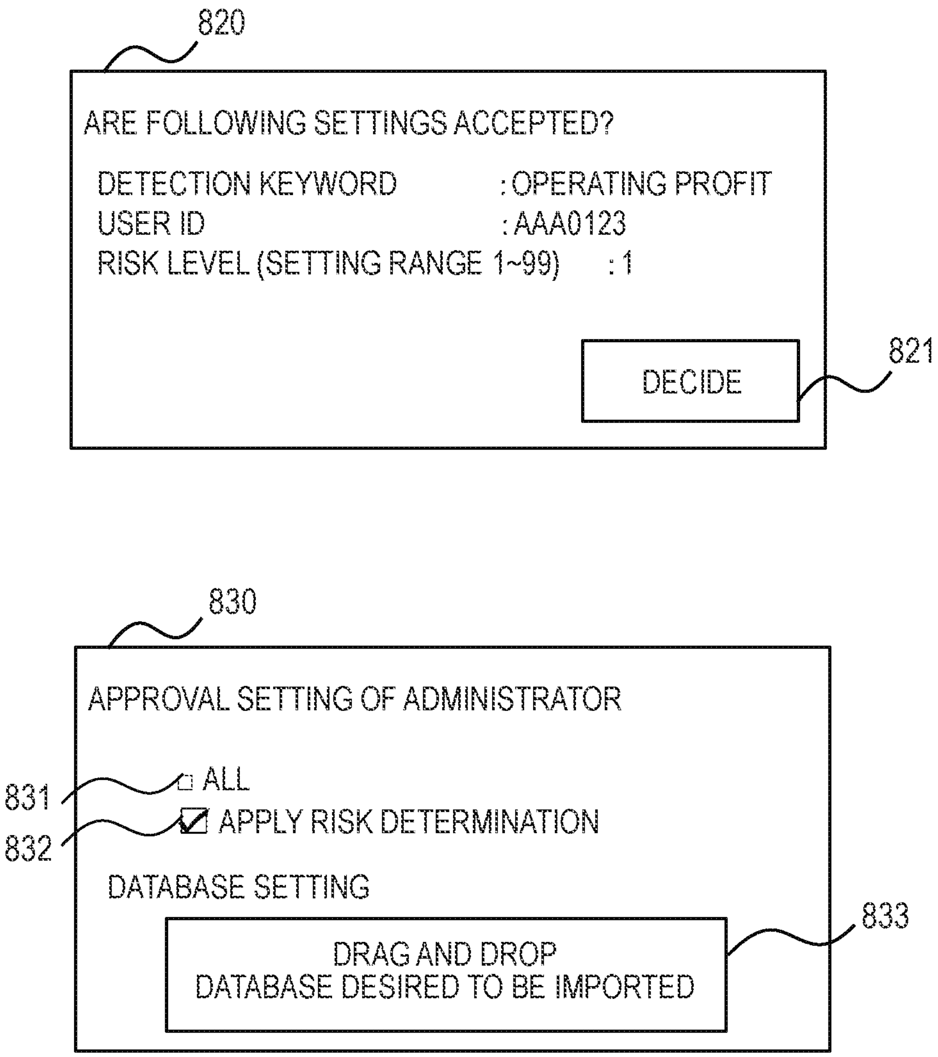
FIG. 8B is a diagram for explaining a configuration for the administrator to confirm the inspection result of the print job.

FIGS. 8A and 8B are diagrams for explaining a configuration for the administrator to confirm the inspection result of the print job (the process result recorded in S409 of FIG. 4). Hereinafter, FIGS. 8A and 8B are collectively referred to as FIG. 8.

A confirmation screen 800 is an example of a screen in a case where the log management database 115 in which the process result is stored in S409 of FIG. 4 is displayed on the display unit 226.

The confirmation screen 800 may be displayed on the web browser of the administrator terminal 104 by the administrator accessing the image processing server 102 from the web browser running on the administrator terminal 104, executing user authentication and referring to the organization's personal information database 116.

The confirmation screen 800 includes a result list display area 801, a period designation button 802, a risk value sort button 803, a setting button 806, and a logout button 807.

The results of the log management database 115 are displayed in the result list display area 801. The result list display area 801 includes a result summary display area 804 for displaying an outline of each record of the log management database 115, and a detail display button 805 for displaying the details of the result summary display area 804.

The period designation button 802 enables to filter data from the reception time of job attributes in the log management database 115.

The risk value sort button 803 enables to sort the risk values in the log management database 115.

The setting button 806 is a button for the administrator to execute settings. When the setting button 806 is selected, a setting screen 830 is displayed on the display unit 226 or the like.

On the setting screen 830, selection buttons 831 and 832 enable to select whether the approval setting of the administrator is required for all documents whose confidential information has been detected by the confidential information detection processing portion 303 (832), or whether the approval is required for only a document whose risk is present (831) by the risk determination processing portion 305 as in the present embodiment.

With respect to the setting of the database, for example, there is an upload area 833 as a database updating method. The database prepared by the administrator can be easily applied to the upload area 833.

The logout button 807 is a button for ending displaying the confirmation screen 800 on the display unit 226.

A confirmation screen 810 is a screen for displaying one record in the log management database 115 in detail. The request reception processing portion 302 requests the main processing portion 301 to execute the process when the operation of the user selecting the detail display button 805 is received via the operation unit 227 or the like.

The result display processing portion 308 receives the process request from the main processing portion 301, acquires a record corresponding to the detail display button 805 from the log management database 115, and displays the record on the confirmation screen 810. The details will be described later with reference to FIGS. 9, 10 and 11.

The confirmation screen 810 includes an image display area 811, a weighting result information display area 812, a return button 813, an approval button 814, a refusal button 815, and job attribute selection buttons 816 to 818. In the example of the confirmation screen 810, the job attribute selection button 816 is selected.

The image display area 811 is an area for displaying an image of a target record in the log management database 115.

The weighting result information display area 812 is an area for displaying the weighting result information of the target record in the log management database 115, the risk value, and printability. In the figure, "print restriction" indicates that printing is impossible. Although not illustrated, if "printable" is shown, printing is possible.

The approval button 814 enables the administrator to approve the printing of the print job in which the printability of the target record is set to "print restriction". The print restriction of the approved print job is released, the printing is permitted, and the print job is transmitted to the image forming apparatus 101.

On the other hand, the refusal button 815 enables to refuse the printing of the print job set to "print restriction" and notify the user who executed the printing of a warning message.

When the refusal button 815 is pressed for the print job whose printability of the target record is "printable", a print job similar to the relevant print job can be set as a print restriction target from next time, and a warning message can be notified to the user who executed the printing.

The job attribute selection buttons 816 to 818 are buttons for selecting the job attributes in the case of reflecting the setting of the printability in the keyword risk database 114 by the approval button 814 or the refusal button 815.

When the approval button 814 and the job attribute selection buttons 816 to 818, or the refusal button 815 and the job attribute selection buttons 816 to 818 are selected, the request reception processing portion 302 requests the main processing portion 301 to execute the process via the operation unit 227.

The main processing portion 301 requests the setting update processing portion 306 to set the risk level of the detection keyword of the job attribute displayed in the weighting result information display area 812.

A confirmation screen 820 is a screen for updating the keyword risk database 114 after the job attribute selection button 816 and the approval button 814 are selected. On the confirmation screen 820, the risk level of the detection keyword is set for the user ID "AAA0123". When the approval button 814 is selected, the risk level of the detection keyword corresponding to "user ID" is set to the minimum (in the present embodiment, "1") in order to permit the printing.

The risk level of the detection keyword corresponding to the job attribute may be set by the administrator via the operation unit 227, instead of from the confirmation screen 820.

A decision button 821 is a button for deciding the risk level. When the decision button 821 is selected, the setting update processing portion 306 updates the keyword risk database 114 to obtain the updated keyword risk database 114.

An example of the updated keyword risk database 114 is shown in Table 7.

TABLE 7

| Updated keyword risk database 114 | | |
|---|---|---|
| Detection keyword | Corresponding job attribute | Risk level of detection keyword corresponding to job attribute |
| operation profit | user ID (other than accounting department) | 3 |
| operation profit | user ID (AAA0123) | 1 |
| company secret | IP address | 2 |

Thus, in the process of the print job after the keyword risk database 114 is updated, in the attribute weighting process (S405), the attribute weighting processing portion 304 acquires the risk level from the updated keyword risk database 114.

Specifically, the attribute weighting processing portion 304 acquires the job attribute "user ID (AAA0123)" corresponding to the detection keyword and the risk level "1" of the detection keyword corresponding to the job attribute.

As a result, the attribute weighting processing portion 304 stores the updated weighting result information "1" in the storage unit 228.

Table 8 shows an example of the updated attribute weighting process result "updated weighting result information 1" with respect to "job information 1".

TABLE 8

| Updated weighting result information 1 | | |
|---|---|---|
| Detection keyword | Operation profit | 1 |
| user ID | AAA0123 | 1 (1 × 1) |
| reception time | 2022/9/14 10:15 | 1 |
| IP address | 192.10.4.5 | 2 |

Further, in the subsequent risk determination process (S406), the risk determination processing portion 305 calculates the risk value "2" for the updated weighting result information 1 which is the weighting result information.

The specific risk value calculation in the present embodiment is as follows: 1 (risk level of detection keyword)×1 (risk level of user ID)×1 (risk level of reception time)×2 (risk level of IP address)="2".

In this way, by appropriately setting the keyword risk database 114, it is possible to make "printable" the availability determination of the print job restriction for a similar print job after next time.

Similarly, even when the refusal button 815 is selected, by appropriately setting the risk level of the detection keyword, it is possible to make "print restriction" the availability determination of the print job restriction for a similar print job after next time. The details will be explained with reference to FIG. 12.

Figure 9:
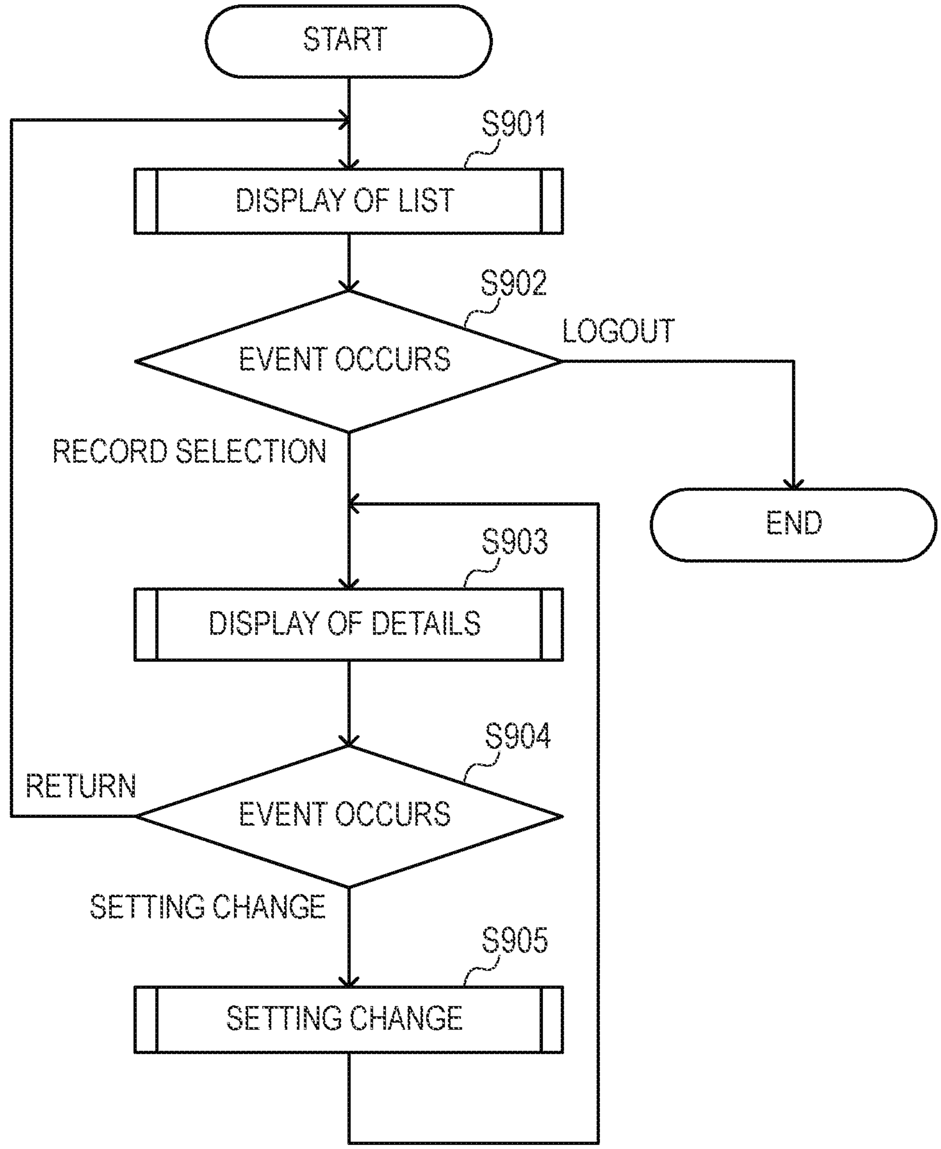
FIG. 9 is a flowchart for explaining a process of displaying and confirming a target record according to a second embodiment.

FIG. 9 is a flowchart for explaining a process of displaying and confirming a target record in the log management database 115 according to the second embodiment. The process of this flowchart is executed by the image processing server 102.

In S901, the main processing portion 301 requests the result display processing portion 308 to list-display the log management database. The details will be explained with reference to FIG. 10.

Next, in S902, the request reception processing portion 302 requests the main processing portion 301 to execute the process received by the operation unit 227 (an event occurs). Here, when the logout button 807 of FIG. 8 is selected (logout) in the operation unit 227, the request reception processing portion 302 ends the process of this flowchart.

On the other hand, when the detail display button 805 of FIG. 8 is selected in the operation unit 227 (record selection), the main processing portion 301 advances the process to S903.

In S903, the main processing portion 301 requests the result display processing portion 308 to display the details of the management database. The details will be explained with reference to FIG. 11.

Next, in S904, the request reception processing portion 302 requests the main processing portion 301 to execute the process received by the operation unit 227 (an event occurs). When the return button 813 of FIG. 8 is selected in the operation unit 227 (return), the request reception processing portion 302 returns the process to S901.

On the other hand, when the approval button 814 or the refusal button 815 of FIG. 8 is selected in the operation unit 227 (setting change), the request reception processing portion 302 advances the process to S905. The details will be explained with reference to FIG. 12.

Figure 10:
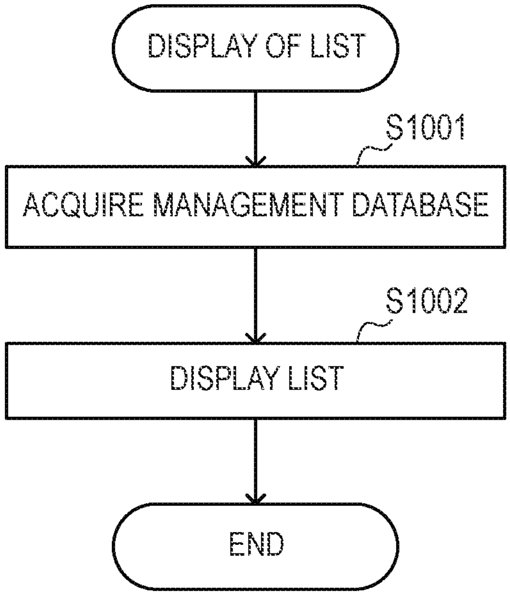
FIG. 10 is a flowchart for explaining a process of displaying a log management database on a display unit according to the second embodiment.

FIG. 10 is a flowchart for explaining a process of displaying the log management database 115 on the display unit 226 according to the second embodiment. The process of this flowchart is executed by the result display processing portion 308 of the image processing server 102.

In S1001, the result display processing portion 308 acquires the log management database 115, and stores it in the storage unit 228.

In S1002, the result display processing portion 308 displays, on the display unit 226, the log management database acquired in S1001 held in the storage unit 228 as the confirmation screen 800, and ends the process of this flowchart.

Figure 11:
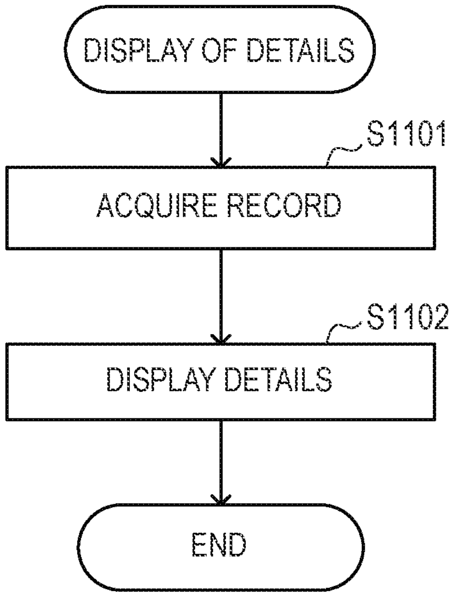
FIG. 11 is a flowchart for explaining a process of displaying the log management database on the display unit according to the second embodiment.

FIG. 11 is a flowchart for explaining a process of displaying the log management database 115 on the display unit 226 according to the second embodiment. The process of this flowchart is executed by the result display processing portion 308 of the image processing server 102.

In S1101, the result display processing portion 308 acquires a record of the log management database 115 selected by the detail display button 805, and stores it in the storage unit 228.

In S1102, the result display processing portion 308 displays, on the display unit 226, the log management database acquired in S1101 held in the storage unit 228 as the confirmation screen 810, and ends the process of this flowchart.

Figure 12:
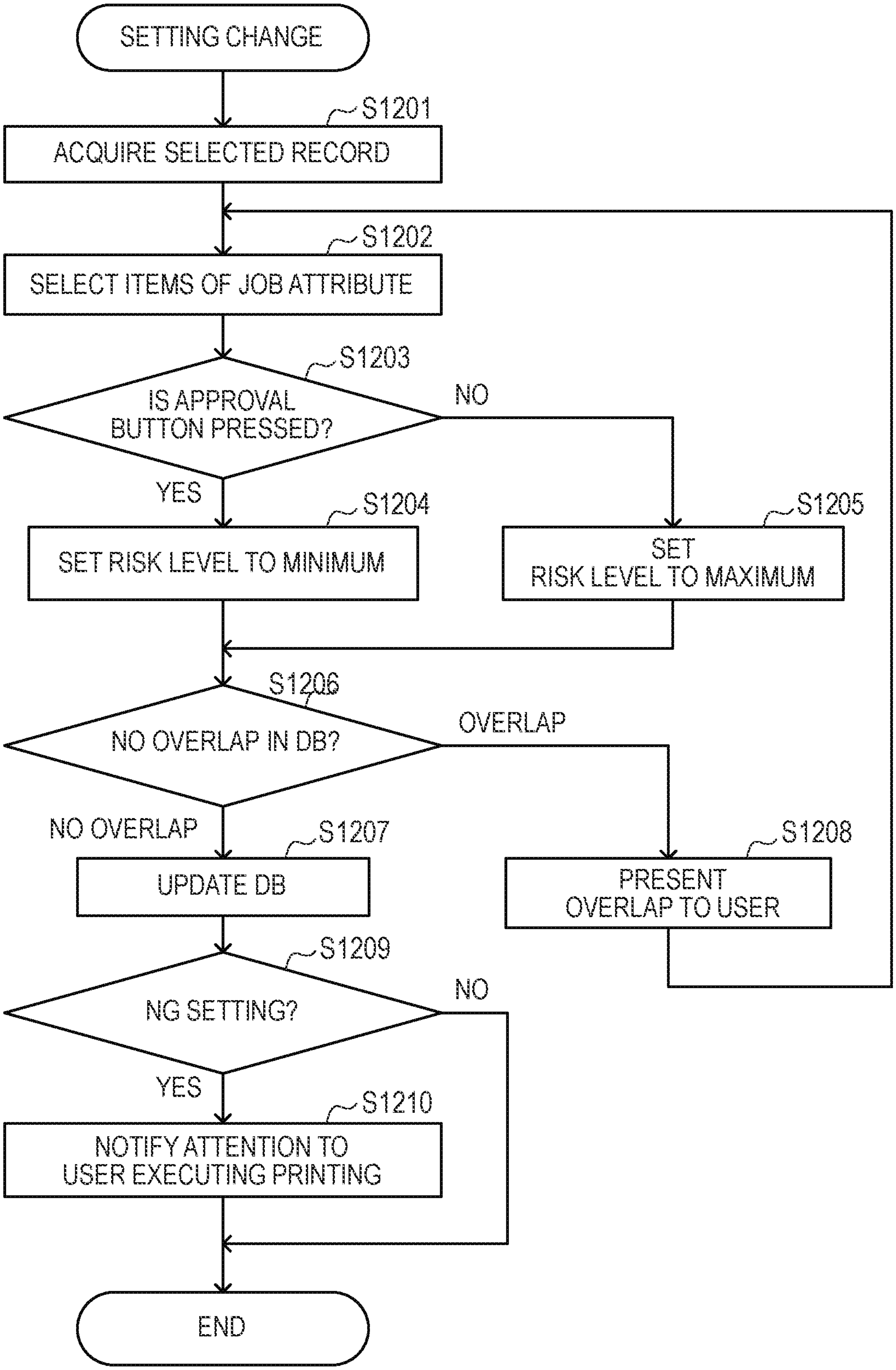
FIG. 12 is a flowchart for explaining a process of changing printability of a target record and changing attribute weighting setting according to the second embodiment.

FIG. 12 is a flowchart for explaining a process of changing the printability of the target record in the log management database 115 and changing the setting of the attribute weighting process (S405) according to the second embodiment. The process of this flowchart is executed by the setting update processing portion 306 of the image processing server 102.

In S1201, the setting update processing portion 306 acquires the weighting result information displayed on the confirmation screen 810 and the printability from the log management database 115, and stores them in the storage unit 228.

Next, in S1202, the setting update processing portion 306 acquires the selection contents of the job attribute selection button 816 and the approval button 814 or the refusal button 815 from the operation unit 227, and stores them in the storage unit 228.

Next, in S1203, the setting update processing portion 306 determines whether or not the approval button 814 is selected. Here, when the approval button 814 is selected (YES in S1203), the setting update processing portion 306 advances the process to S1204.

In S1204, the setting update processing portion 306 changes the risk level of the job attribute acquired in S1202 to minimum, and stores it in the storage unit 228. For example, when the setting range of the risk level is "1 to 99", "1" is set. The administrator may set the risk level via the operation unit 227.

On the other hand, when the refusal button 815 is selected (NO in S1203), the setting update processing portion 306 advances the process to S1205.

In S1205, the setting update processing portion 306 changes the risk level of the job attribute acquired in S1202 to maximum, and stores it in the storage unit 228. For example, when the setting range of the risk level is "1 to 99", "99" is set. The administrator may set the risk level via the operation unit 227.

After S1204 or S1205, in S1206, the setting update processing portion 306 decides whether or not, in the keyword risk database 114, there is an overlap of the risk level determination condition and the risk level set in S1204 or S1205.

Here, when there is the overlap in the keyword risk database 114 ("overlap" in S1206), the setting update processing portion 306 advances the process to S1208.

In S1208, the setting update processing portion 306 presents to the user via the display unit 226 that the condition has already been set in the keyword risk database 114, and returns the process to S1202.

On the other hand, when there is no overlap in the keyword risk database 114 ("no overlap" in S1206), the setting update processing portion 306 advances the process to S1207.

In S1207, the setting update processing portion 306 updates the risk level set in S1204 or S1205 to the keyword risk database 114, and advances the process to S1209.

In S1209, the setting update processing portion 306 determines whether or not the keyword risk database 114 is updated by selecting the refusal button 815 (NG setting).

Here, when the keyword risk database 114 is updated by selecting the approval button 814 (NO in S1209), the setting update processing portion 306 ends the process of this flowchart.

On the other hand, when the keyword risk database 114 is updated by selecting the refusal button 815 (YES in S1209), the setting update processing portion 306 advances the process to S1210.

In S1210, the setting update processing portion 306 notifies the user of the job information that the printing of the print job has been refused by the administrator (notification of attention), and ends the process of this flowchart. The notified user refers to the organization's personal information database 116.

When the refusal button 815 is selected for the print job that is "printable", the user of the job information is notified that the printability of the print job has been changed from "printable" to "print restriction" to prompt the user to pay attention to print restriction.

When the information of the user corresponding to the approved print job is not registered in the organization's personal information database 116, the information of the relevant user may be automatically registered in the organization's personal information database 116 at the timing of, for example, S1204 or the like.

Besides, such user information may be automatically collected and registered in the organization's personal information database 116 by a batch process or the like.

By the automatic registration of the user information as described above, after this, the print job of the user like this may be "printable" according to other job attributes.

By executing the above process procedure, the risk level of the job attribute is set, and the keyword risk database 114 is updated. In this way, the administrator can easily change the setting when approving with reference to the process result and when changing the restriction of the setting (306, S905).

Further, when the printability of the print job is changed from "printable" to "print restriction", it gives notification to the user who executed the process after the printing, thereby enabling to pay attention (S1210).

As described above, according to each embodiment, it is possible to filter the high-risk print job among the print jobs with a possibility of confidential information leakage to make it as the confirmation, and it is thus possible to reduce the administrator's work load for the confirmation.

Therefore, it is possible to provide an excellent system capable of achieving both a reduction in the risk of confidential information leakage and a reduction in the impossibility of the administrator's confirmation work.

Note that the configuration and contents of the above various data are not limited thereto, and it is needless to say that data are configured in various configurations and contents depending on the applications and purposes.

Although the embodiment has been described as above, the present disclosure can be implemented as, for example, a system, an apparatus, a method, a program, or a storage medium. Specifically, the present disclosure may be applied to a system including a plurality of devices, or may be applied to an apparatus including a single device.

Further, all configurations obtained by combining the above embodiments are included in the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-037691, filed Mar. 10, 2023, which is hereby incorporated by reference herein in its entirety.

What is claimed is:

1. An information processing apparatus that determines a risk of confidential information leakage in a print job, the information processing apparatus comprising:

at least one memory that stores instructions; and at least one processor that executes the instructions to:

detect confidential information from print data acquired from the print job;

acquire a risk level of each job attribute of the print job;

execute a weighting process for the risk level of each job attribute, using the detected confidential information and information of weight for the job attribute set for each confidential information by selecting, from a weight database, a risk level of a detection keyword corresponding to a combination of the specific detected confidential information and the specific job attribute;

determine the risk of confidential information leakage for the print job, by calculating a unique risk value that includes a result based on both a product of a risk level of an organization setting for the job attribute and the selected risk level of the detection keyword, and a risk level according to the detected confidential information, and comparing the unique risk value to a threshold; and restrict printing of the print job according to a result of the determination of the risk of confidential information leakage.

2. The information processing apparatus according to claim 1, wherein, in the determination, the risk of confidential information leakage for the print job is determined using a risk level according to the detected confidential information and the weighting-processed risk level of each job attribute.

3. The information processing apparatus according to claim 2, wherein the risk level according to the detected confidential information is determined according to the number of detected confidential information.

4. The information processing apparatus according to claim 1, wherein, in a case where the risk level of each job attribute of the print job cannot be acquired, the risk of confidential information leakage is determined as maximum in the risk level.

5. The information processing apparatus according to claim 1, wherein the processor further executes the instructions to:

request an administrator to approve the printing of the print job for which the printing has been restricted; and permit the approved printing for the print job.

6. The information processing apparatus according to claim 5, wherein the processor further executes the instructions to:

in a case where the administrator approves the printing of the print job, execute a setting change for making smaller the risk level of the detection keyword for the job attribute set for the confidential information detected from the print data of the print job.

7. The information processing apparatus according to claim 5, wherein the processor further executes the instructions to:

in a case where the print job for which the printing is not restricted is changed by the administrator to the print job for which the printing has been restricted, execute a setting change for making larger the risk level of the detection keyword for the job attribute set for the confidential information detected from the print data of the print job.

8. The information processing apparatus according to claim 7, wherein the processor further executes the instructions to:

in a case where the setting change is executed, warn a user corresponding to the print job.

9. A control method of an information processing apparatus that determines a risk of confidential information leakage in a print job, the control method comprising:

detecting confidential information from print data acquired from the print job;

acquiring a risk level of each job attribute of the print job;

executing a weighting process for the risk level of each job attribute, using the detected confidential information and information of weight for the job attribute set for each confidential information by selecting, from a weight database, a risk level of a detection keyword corresponding to a combination of the specific detected confidential information and the specific job attribute;

determining the risk of confidential information leakage for the print job by calculating a unique risk value that includes a result based on both a product of a risk level of an organization setting for the job attribute and the selected risk level of the detection keyword, and a risk level according to the detected confidential information, and comparing the unique risk value to a threshold; and restricting printing of the print job according to a result of the determination of the risk of confidential information leakage.

10. A non-transitory computer-readable storage medium that stores instructions, the instructions cause at least one processor to:

detect confidential information from print data acquired from a print job;

acquire a risk level of each job attribute of the print job;

execute a weighting process for the risk level of each job attribute, using the detected confidential information and information of weight for the job attribute set for each confidential information by selecting, from a weight database, a risk level of a detection keyword corresponding to a combination of the specific detected confidential information and the specific job attribute;

determine a risk of confidential information leakage for the print job by calculating a unique risk value that includes a result based on both a product of a risk level of an organization setting for the job attribute and the selected risk level of the detection keyword, and a risk level according to the detected confidential information, and comparing the unique risk value to a threshold; and restrict printing of the print job according to a result of the determination of the risk of confidential information leakage.

* * * * *